United States Patent Office 3,416,315
Patented Dec. 17, 1968

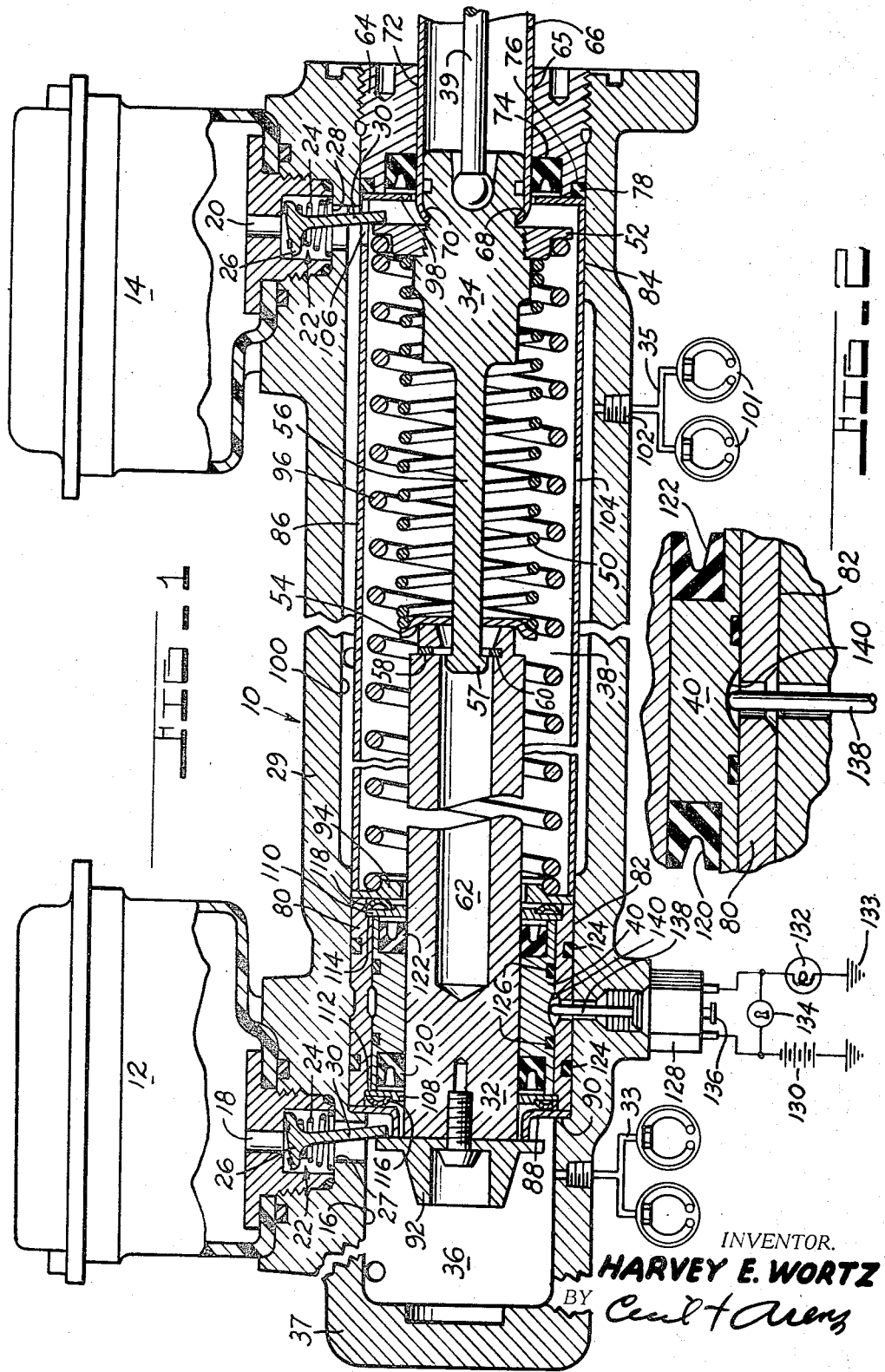

3,416,315
BRAKE SYSTEM FAILURE WARNING DEVICE
Harvey E. Wortz, Kokomo, Ind., assignor to The Bendix Corporation, a corporation of Delaware
Filed Apr. 10, 1967, Ser. No. 629,784
6 Claims. (Cl. 60—54.6)

ABSTRACT OF THE DISCLOSURE

A split system type of master cylinder for a vehicle braking system having two plungers arranged in tandem to divide the cylinder into two pressure chambers with a bearing member located between said chambers and movable axially in response to a predetermined differential pressure therebetween to actuate a warning device which appraises the vehicle operator of a brake malfunction.

Background of Invention

In recent years as a safety measure, there has been a shift from a single chamber brake master cylinder in which all four wheel brakes of the vehicle are connected to said single chamber, to the split system master cylinder having two independent chambers, one in communication with the front brakes and the other in communication with the rear brakes, so that failure of either front or rear brakes due to loss of hydraulic fluid, will not impair the other brakes. Although this arrangement added immeasurably to the safety of the braking system, it is obvious that the car could not operate safely over long periods with only the front or rear brakes functioning. Since most vehicle operators would not be completely aware of the malfunctioning of the braking system with the loss of only the front or the rear brakes, it is necessary that the operator be apprised of such a failure of the vehicle brakes by an alarm of some sort.

There have been various attempts at designing into split system master cylinders a device which will apprise a vehicle operator of the loss of one set of brakes, whether front or rear, but all such devices have been complicated and expensive. Very often the warning device is not an integral part of the split master cylinder but located in the braking system remote therefrom, thus necessitating additional piping, etc. Patent 3,228,194 is an example of such a device remotely located from the master cylinder. Patent 2,353,304 shows a warning device located adjacent a split master cylinder having parallel cylinder bores or chambers as distinguished from a tandem type split master cylinder shown herein. Applicant's device is an integral part of a tandem split system master cylinder and requires no additional piping and adds very little to the cost of manufacture over conventional split system master cylinders not employing warning devices.

SUMMARY

Therefore, it is an object of this invention to provide a brake failure warning device forming an integral part of a split system master cylinder, thus utilizing many of the existing parts of the master cylinder.

Another object of this invention is to provide a brake failure warning device forming an integral part of a split system master cylinder which comprises two plungers arranged in tandem in said cylinder to provide a pair of chambers and wherein the bearing member for one of the plungers is operative in response to the difference in pressures existing in said pair of chambers to cause energization of said warning device.

A more important object of this invention is to provide an actuator for a brake failure warning device which also functions as a bearing for one of the plungers of a split system master cylinder.

Other objects and features of the invention will be apparent from the following description of the mechanism taken in connection with the accompanying drawings.

Brief description of the drawings

FIGURE 1 is a longitudinal sectional view of the brake system failure warning device of this invention; and, FIGURE 2 is an enlarged fragmentary view of the differential pressure bearing actuator.

Description of the preferred embodiment

Referring to the embodiment shown in FIG. 1, the brake failure warning device comprises a master cylinder which is indicated generally by reference numeral 10 and includes reservoirs 12 and 14, containing hydraulic fluid. The reservoirs 12 and 14 communicate with a bore 16 of the master cylinder through ports 18 and 20 respectively, which supply hydraulic fluid to the braking system with which the master cylinder is associated. Each of the ports 18 and 20 is provided with a tilt valve 22 (since the tilt valves are the same in construction, the description will apply to both valves) urged in a port closing direction by springs 24 interposed between the valve heads 26 and the shoulders formed at the outer ends of transverse bores 27 and 28. These transverse bores 27 and 28, located at the left and right ends of the master cylinder bore 16, communicate the bore 16 with the reservoirs 12 and 14 via the ports 18 and 20. The valve head 26 is formed with a stem member 30 extending radially inwardly into the bore 16 to be engaged by plungers 32 and 34 when in a retracted or released position as shown, so as to tilt each of the valves to an open position to establish communication with the reservoirs and the respective brake lines 33 and 35. The bore 16 which extends over the axial length of the master cylinder housing 29 is closed at one end by a wall 37 and is open at the other end to receive push rod 39. The bore 16 is divided into two pressure chambers 36 and 38 by the pressure producing plungers 32 and 34 respectively for pressurizing the fluid in the front and rear brake lines 33 and 35. The plunger 32 is slidably supported on bearing member 40, the latter of which also functions as an actuator for a brake failure warning device in a manner to be hereinafter described.

The plungers 32 and 34 are interconnected by a preloaded spring 50 so that the plungers will move in unison in the bore so long as the respective pressures developed in the chambers 36 and 38 are such as to prevent collapse of the preloaded spring 50. However, any pressure build-up in chamber 36, for example, which opposes plunger 32 with a force in excess of the preload on the spring 50, and without a corresponding build-up on pressure in chamber 38, will cause the spring 50 to collapse, thus introducing relative movement between the plungers 32 and 34. The two plungers 32 and 34 are interconnected so that they can move relative to one another upon collapse of the spring 50 in the event there is a failure in any portion of the hydraulic system involving either the front or rear brake lines 33 and 35. The preloaded spring 50 has one of its ends abutting against a retainer member 52 adjustably secured to the plunger 34. The opposite end of the preloaded spring 50 is carried in a spring retainer member 54 which seats on the end of the plunger 32 opposite its pressurizing end, the latter of which protrudes into the chamber 36. The preloaded spring 50 retains the two plungers 32 and 34 in a prescribed over-all length in their retracted or released position in the bore 16 through the interengagement of an enlarged end 57 of a longitudinal axially extending member 56 of the plunger 34 with a locking ring 58 located in groove 60 of an axially extending recess 62 of the plunger 32. With the preloaded spring 50 interconnected between the plungers 32 and mild mechanical treatment may, for instance, consist of striking, rubbing, brushing, or vibrating. Such treatment during the electrical treatment will not only fold out but also spread the material out.

At this point in the flow sheet of FIGURE 1 the sheet material is in a spread-out condition wherein the individual fibrils, making up the material, are parallel to the longitudinally axis of the sheet material. In many cases, and for many applications, this is a desirable configuration. However, for certain textile products the yarn used in the manufacture therein should not be lean and smooth but rather should have a high percentage of loose fibrils along the surface of the web or sheet as the case may be. For instance, in the case of blankets, carpets, and fabrics made from woolen yarns, it is essential to use a bulky yarn which is not produced under the process described in the above-identified patent.

My invention resides in forming a pile fabric from this polymeric sheet material as it emerges from the folding-out step.

With reference to FIGURES 2 and 3, after the sheet material 10 has been folded out as described hereinabove, it passes between a pair of generally cylindrical rollers 12 and 13, which are rotatably mounted in frame plates 14 and 16 respectively. These frame plates 14 and 16 extend vertically from a base plate 18 which is mounted on wheels 20. This unit is able to be wheeled into a position to receive the film 10 directly from the folding-out step described in FIGURE 1 in the event that it is desirable to make the whole process continuous. The sheet or web 10 passes from the rollers 12 and 13 to a roller 54 (see FIGURE 6) which is also rotatably mounted in plates 14 and 16.

With reference to FIGURE 6, a plurality of rollers 54 are shaped to form a crown 56 at their centers. As a result, the fibrils in the central portion of film 10 passing over the crown 56 will break while those in the edge portion of the film passing over the edge of the roller will not. This action of crowned rollers 54 (FIGURE 2) causes the fibrils in the center portion of sheet 10 to break. This web is particularly useful in making yarn and as such it is twisted by conventional yarn twisting means as it is wound onto a spool 58.

As shown in FIGURES 2 and 3, rollers 13, 54 (only one roller is shown; however, it would be within the skill of the art to connect a plurality of crowned rollers into the mechanism) and 29 are connected to a suitable driving mechanism 30. This mechanism comprises an endless belt or chain 32 which passes over a pulley or sprocket 34 which is fixed to roller 54, then over a sprocket 36 which is fixed to roller 13, then over a sprocket 38 which is fixed to roller 29, then over an idler sprocket 40, then over a drive sprocket 42, which is driven by any suitable power source such as electric motor 44, and finally back over sprocket 34. The rollers 12, 13, 54, 28, and 29 are rotated in the directions shown by the arrows.

With reference to FIGURE 4, roller 22 is provided with a plurality of grooves 24 and a plurality of needles 26 or other similar sharp, pointed implements, which project radially from the center of the grooves 24. These needles may be secured in the grooves 24 in any suitable manner. As the sheet 10 passes over the roller 22, portions of it are channelled into the grooves 24 and become impaled upon the needles which penetrate through the sheet material and cause a portion of the individual fibrils to be severed. The degree of breakage would be determined by the number of grooves in the roller and the number of pins in the grooves; however, no more than one-half of the fibers passing over the roller should be broken in order to retain sufficient web strength. In the preferred embodiment we show only one roller but it would be within the skill of the art to adapt a plurality of rollers over which the film could be passed. The film after passing over the pin-studded roller 22 is received by a pair of pick-up rollers 28 and 29 which are also rotatably mounted in the frame plates 14 and 16. These rollers feed the bulky sheet material to a suitable take-up mandrel (not shown).

FIGURE 5 illustrates another embodiment of my invention. In this embodiment a roller 46 contains a plurality of grooves 48 around the perimeter thereof. These grooves are cut at an angle of 45° to the horizontal axis 50 of the roller 46. This roller 46 is attached to frames 14 and 16 in place of roller 22. A plurality of knife blades 52 are positioned around the circumference of roller 53 rotatably mounted between the vertical frames 14 and 16 a predetermined distance from roller 46. The sheet 10 is passed between the roller and the blade. The blade 52 is rotated in close enough proximity to the roller 46 so that portions of the film 10 pass over the crown of the grooves 48 and are cut by the rotating blades 52. Because of the angle of inclination of these grooves a discontinuous chopping of the individual fibrils results without cutting entirely across the sheet itself. The strength of the sheet itself is not significantly affected. This fabric possesses a tremendous advantage over a normal pile fabric because the pile fibers form an integral part of the sheet and are firmly anchored to the surface of the sheet.

In order to illustrate with greater particularity and clarity the operation of my process, the following examples are offered as illustrative of the operation thereof. The specific materials and conditions given in the examples are presented as being typical and should not be construed to limit my invention unduly.

EXAMPLE I

A 60-inch wide fibrillated web of 0.8 mil polyethylene, having a density of 0.95 gram/cc. and a melt index of 0.3 (ASTM D 1238–5DT, Condition E), is threaded through the machine described in FIGURE 2. A chopper roller 53 is provided with 12 tempered spring steel blades 52 around its circumference. The blades 52 coact with a 12-inch diameter grooved roller 46, made of mild steel and coated to a thickness of 60 mils with 80 durometer rubber. Each groove 48 in roller 46 defines an ellipse in a plane making a 45° angle with the roller axis. These grooves are ⅛-inch wide, ⅛-inch deep, and spaced so that their centers are ¼-inch apart, and having all their edges and corners chamfered and rounded on a $\frac{1}{16}$-inch radius. Bulk film is fed to roller 12 at the rate of 20 feet per minute while the machine is being adjusted to insure clean, uniform cuts. After adjustment, the rate is increased to 150 feet per minute and about 2000 feet of the material is fed through the machine.

Air filters 2½ feet square are produced from some of this material by laminating 21 layers of this bulked film together, each layer being laid at right angles to the adjacent layers 21 and being stitched together in both directions across the film at 6-inch intervals with cotton string and subsequently edged with an aluminum channel having a ⅛-inch flange.

In another application ten 8-foot sections of this bulked fibrilated web are stitched together on 4-inch centers both lengthwise and crosswise and the edges bound to make an exceptionally warm, lightweight blanket.

Example II

The rollers 46 and 53 are replaced with a 12-inch diameter pin-studded roller 22 similar to that shown in FIGURE 4. The grooves 24 are ½-inch center-to-center with a sharp 60° included angle peak between the grooves. In each groove 36 equally spaced cylindrical pins 26 are positioned wherein each pin is $\frac{3}{32}$-inch in diameter and has a flat, sharp edged top portion located $\frac{3}{32}$-inch below the peaks. Web material similar to that used in Example I is threaded through the machine and the machine is started and run at an initial rate of about 15 feet per minute output while adjustments of the film tension over the pin-studded roller 22 are made. After adjustment, the rate is increased to 150 feet per minute to produce approximately plunger 32 against the resistance offered by the preloaded spring 50 so as to develop a hydraulic pressure in chamber 38, which is communicated to the rear brake line 35 via the port 102. Under such circumstances, where there has been a failure in chamber 36, with a resultant loss of pressure in that chamber, the pressure build-up in chamber 38 acting on the right end of the bearing 40, which is exposed to the pressure of chamber 38, will cause the bearing or actuator member to shift to the left against the wave washer 116. This movement of the actuator member 40 to the left depresses the pin 138 which rides on the cam groove 140 to thereby energize the alarm system through the overcenter switch 128, alerting the vehicle operator to the brake failure by energizing a light 132.

Assume a loss of fluid in the brake line 35 and hence chamber 38. A brake application will not pressurize the fluid in chamber 38 as the plungers 32 and 34 move leftwardly. The input forces applied to the plunger 34 will be transferred to the plunger 32 through the preloaded spring 50, thus developing pressure in the chamber 36 which is communicated to the front brake line 33 to actuate the brakes. As a result of this pressure build-up in the chamber 36 the bearing member 40, due to the fluid pressure acting on the left end of the bearing member, will shift to the right against the wave washer 118 to thereby actuate the alarm system through the pin 138 which rides on the cam groove 140 as heretofore explained in connection with the loss of pressure in chamber 36. The vehicle operator is accordingly informed of the malfunction of the rear brakes.

It is my intention to include within the scope of the following claims all equivalent applications of the invention whereby the same or substantially the same results may be obtained.

I claim:

1. A device for detecting the failure of the front or rear brakes of the vehicle and appraising a vehicle operator of such failure comprising a hydraulic split system master cylinder having a bore which is divided into two chambers, two plungers, one for each chamber, said plungers being arranged in axial relationship with respect to each other and interconnected so as to pressurize said chambers upon displacement of said plungers axially in said bore, one chamber is communicable with the front brakes and the other chamber is communicable with the rear brakes of said vehicle, a bearing member located in the bore between said pressure chambers for slidably receiving and supporting one of the plungers, said bearing member having axial movement in said bore, said bearing member having opposed ends subjected to the pressures in the respective chambers, means retaining said bearing member in a fixed axial location in said bore until the pressures existing in said respective chambers attains a predetermined differential value, and means responsive to axial movement of said bearing upon attainment of said differential pressure for alerting a vehicle operator to a brake malfunction.

2. The device as recited in claim 1 wherein a preloaded spring is interposed between said plungers to form a collapsible connection therebetween.

3. The device as recited in claim 1 wherein said bearing retaining means for holding the bearing in fixed axial location is characterized by prestressed centering members acting on said opposed ends of the bearing member to permit axial movement of the latter upon attainment of a predetermined differential pressure in said chambers.

4. The device as recited in claim 3 wherein said prestressed centering members are formed by annular spring members.

5. A brake failure warning device for vehicle brakes comprising a split system master cylinder which includes two relatively movable plungers arranged in tandem relationship to provide two pressure chambers, one of said chambers is communicable with the front brakes and the other of said chambers is communicable with the rear brakes of said vehicle, one of said plungers having one end forming a wall of one chamber and its other end forming a wall of the other chamber, a bearing member slidably receiving said one plunger and located between said chambers, said bearing having opposed ends subjected to the pressures of the respective chambers and being movable axially on said plunger as a result of predetermined differential pressures in said chambers, means retaining said bearing member against axial movement until said predetermined differential pressure is attained, and means operatively connected to said bearing member to respond to its axial movement to apprise the vehicle operator of a brake malfunction.

6. The structure as claimed in claim 5 wherein said bearing member retaining means includes a pair of wave washers each located at a respective end of said bearing member for resisting movement against axial displacement.

References Cited

UNITED STATES PATENTS 3,228,194    1/1966    Blair _____ 60—54.5
3,358,446    12/1967    Wortz _____ 60—54.5

MARTIN P. SCHWADRON, *Primary Examiner.*

ROBERT R. BUNEVICH, *Assistant Examiner.*

U.S. Cl. X.R.
188—1, 152; 303—84

UNITED STATES PATENT OFFICE
CERTIFICATE OF CORRECTION

Patent No. 3,416,315                                        December 17, 1968

Harvey E. Wortz

It is certified that error appears in the above identified patent and that said Letters Patent are hereby corrected as shown below:

Column 4, line 51, after "34" cancel "and"; line 67, after "washers" insert -- 116 and 118. So long as the pressures in the chambers --.

Signed and sealed this 7th day of April 1970.

(SEAL)
Attest:

Edward M. Fletcher, Jr.                          WILLIAM E. SCHUYLER, JR.
Attesting Officer                                        Commissioner of Patents